J. DYMOND.
Apparatus for Treating Cane-Juice With Sulphurous Acid Gas.
No. 134,655. Patented Jan. 7, 1873.
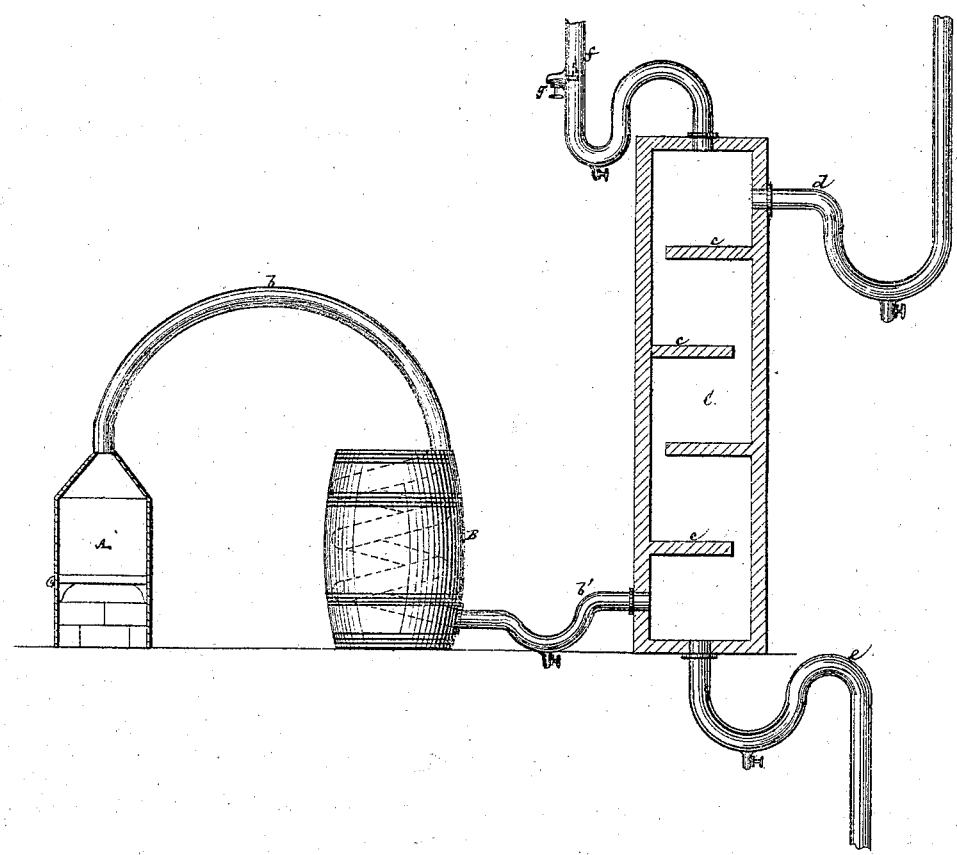

UNITED STATES PATENT OFFICE.

JOHN DYMOND, OF NEW YORK, N. Y.

IMPROVEMENT IN APPARATUS FOR TREATING CANE-JUICE WITH SULPHUROUS-ACID GAS.

Specification forming part of Letters Patent No. 134,655, dated January 7, 1873.

*To all whom it may concern:*

Be it known that I, JOHN DYMOND, of the city, county, and State of New York, have invented an improvement in apparatus for treating liquids with gas or vapor, more especially applicable to the treatment of sugar-cane juice with sulphurous-acid gas or other gas or vapor for the purpose of decolorizing and defecating said juice; and the following is a specification thereof:

Although applicable to the chemical treatment of various liquids for different purposes, and although different gases or vapors may be employed, it will suffice here to describe the invention as applied to the decolorizing and defecating of sugar-cane juice by its exposure to sulphurous-acid gas. The invention consists in a combination of a gas generator or stove, a cooler through which the gas is passed, an upright cylinder or vessel constructed to expose the liquid under treatment in thin layers or streams as it descends through said vessel to the gas flowing therethrough in an opposite direction or course, and an exhausting or forcing device for accelerating the flow of the gas up through the vessel in which the liquid is treated. This combination constitutes a most efficient apparatus for exposing the liquid under treatment to the action of the gases used to chemically treat them.

The accompanying drawing represents a partially-sectional elevation of my improved apparatus adapted to the decolorizing and defecating or treatment of sugar-cane juice or solution of sugar by its exposure to sulphurous-acid gas.

A is the stove or generator, in which the sulphur is heated to produce sulphurous-acid gas that passes by a pipe, $b$, to a cooler, B, containing water, through which the gas is passed without being brought in contact by means of a worm-like continuation of the pipe $b$, thus avoiding all injurious effects from the use of said gas while hot, likewise any injury to the gas resulting from direct contact of it with the water used to effect the cooling. The gas thus cooled is conveyed by a pipe, $b'$, from the worm within the cooler to the vessel C, in which the juice is exposed to treatment by the gas, the pipe $b'$ connecting with said vessel at or near its bottom, and being constructed or provided with a trap to prevent any acid condensed in the worm or pipe connecting therewith from being drawn or forced to mingle with the juice under treatment.

The vessel C is composed of a close upright cylinder or box, constructed or provided with any desired number of plain or perforated diaphragms, $c$, operating to distribute the juice in thin layers or streams as it descends through the vessel from an upper supply-pipe, $d$, while the sulphurous-acid gas takes an upward or opposite course through said vessel, thus freely exposing the juice to the action of the gas. The juice supply-pipe $d$, as also a pipe, $e$, at the bottom of the vessel for discharging the treated juice, are each constructed or provided with a trap to effect a closing by the juice of the vessel C, so that a partial vacuum may be maintained in the latter. The vessel C is also provided at or near its top with a pipe, $f$, having a steam-jet, $g$, in it to produce suction or draft of the gas up through and out of the vessel, thus accelerating the flow of the gas and effecting a more intimate exposure of the juice to the action of the gas. This pipe $f$ is likewise constructed or provided with a trap arranged below the steam-jet to prevent any acid which may be condensed in the pipe from falling into the vessel C to mingle with the juice.

What is here claimed, and desired to be secured by Letters Patent, is—

The combination of the stove or generator A, the cooler B, the diaphragm treating-vessel C, an exhausting or forcing device, $g$, and the pipes $b'$, $d$, $e$, and $f$, constructed or provided with traps, substantially as and for the purpose herein set forth.

JOHN DYMOND.

Witnesses:
MICHAEL RYAN,
FRED. HAYNES.